Patented Dec. 16, 1924.

1,519,547

UNITED STATES PATENT OFFICE.

MELVON A. MARQUETTE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

LUBRICATING RUBBER SURFACES.

No Drawing. Application filed November 12, 1923. Serial No. 674,386.

*To all whom it may concern:*

Be it known that I, MELVON A. MARQUETTE, a citizen of the United States of America, residing at Chicopee Falls, in the county of Hampden and State of Massachusetts, have invented certain new and useful Improvements in Lubricating Rubber Surfaces, of which the following is a specification.

This invention relates to a compound for use in lubricating or preventing adhesion during vulcanization of rubber surfaces, particularly intended for coating rubber or rubber surfaced annular pressure bags on which tires, particularly of the cord type, are vulcanized, so that the bags and tires will not stick together during vulcanization. Various compounds have been proposed for this purpose, all of them, so far as I am aware, being subject to objections.

The compound prepared according to this invention is inexpensive in character and noninflammable, is thoroughly adherent to the rubber so as not to come off on the workman's fingers with a consequent deleterious transference of the compound to portions of the tires being made, is simple to apply, performs consistently and efficiently its function of preventing adhesion, remains on the tire casing after vulcanization so as in many cases to avoid the necessity of later "painting" the inside of the finished casing commonly practiced to prevent sticking of the inner tube in road use, and possesses other advantages varying with the particular tire or construction methods with which it is employed.

The compound comprises a lubricating material, such as powdered mica, carried in liquid latex, which acts as a binding agent of low cost and great efficacy. The preferred formula is as follows:

Liquid latex 7½ gal.
Water 150 gal.
Mica 170 lbs.
Ammonia 1 pt.

The latex in the above example is preferably of a rubber content of 30 to 35%. The ammonia is a one to one solution of concentrated ammonia in water.

The proportions specified may be varied within fairly wide limits; those given are preferred. I have used successfully a mixture having the following proportions.

Liquid latex 1 gal.
Water 15 gal.
Mica 15 lbs.
Ammonia sufficient to give an alkaline reaction.

The ammonia serves to prevent coagulation of the latex.

Having thus described my invention, I claim:

1. A lubricant for preventing adhesion of rubber surfaces during vulcanization comprising liquid latex and a powdered lubricant.

2. A lubricant for preventing adhesion of rubber surfaces during vulcanization comprising liquid latex and mica.

3. A lubricant for preventing adhesion of rubber surfaces during vulcanization comprising liquid latex, mica, and a substance preventing coagulation of the latex.

4. A lubricant for preventing adhesion of rubber surfaces during vulcanization comprising liquid latex, mica, and ammonia.

5. A lubricant for preventing adhesion of rubber surfaces during vulcanization comprising liquid latex 7½ gal., water 150 gal., mica 150 lbs., and ammonia (1 to 1 solution) 1 pint.

MELVON A. MARQUETTE.